US012614399B2

(12) United States Patent
Tu et al.

(10) Patent No.: US 12,614,399 B2
(45) Date of Patent: Apr. 28, 2026

(54) METHOD, APPARATUS AND SYSTEM FOR INSPECTING CELL CRUSH

(71) Applicant: CONTEMPORARY AMPEREX TECHNOLOGY (HONG KONG) LIMITED, Hong Kong (CN)

(72) Inventors: Yinhang Tu, Ningde (CN); Kunpeng Cui, Ningde (CN); Yifei Gao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 261 days.

(21) Appl. No.: 18/387,475

(22) Filed: Nov. 7, 2023

(65) Prior Publication Data

US 2024/0071111 A1 Feb. 29, 2024

Related U.S. Application Data

(63) Continuation of application No. PCT/CN2023/084745, filed on Mar. 29, 2023.

(30) Foreign Application Priority Data

Aug. 8, 2022 (CN) .......................... 202210946085.7

(51) Int. Cl.
G06K 9/00 (2022.01)
G06V 10/44 (2022.01)
G06V 20/69 (2022.01)

(52) U.S. Cl.
CPC ............ G06V 20/698 (2022.01); G06V 10/44 (2022.01); G06V 20/695 (2022.01)

(58) Field of Classification Search
None
See application file for complete search history.

(56) References Cited

U.S. PATENT DOCUMENTS

2003/0059115 A1 3/2003 Nakagawa
2007/0217676 A1 9/2007 Grauman et al.
(Continued)

FOREIGN PATENT DOCUMENTS

CN 104320610 A 1/2015
CN 104568965 A 4/2015
(Continued)

OTHER PUBLICATIONS

International Search Report issued Jun. 21, 2023 in International Patent Application No. PCT/CN2023/084745 with English translation.

(Continued)

*Primary Examiner* — SJ Park
(74) *Attorney, Agent, or Firm* — XSENSUS LLP

(57) ABSTRACT

The present application relates to a method, apparatus and system for inspecting a cell crush, a computer device, a storage medium, and a computer program product. The method may include: acquiring images of a flowing cell assembly by a high-speed image acquisition device; extracting image features from the images of the cell assembly; performing similarity matching between the image features and a preset crush model to obtain a similarity matching result; and obtaining a cell crush inspection result based on the similarity matching result.

20 Claims, 5 Drawing Sheets

(56) References Cited

U.S. PATENT DOCUMENTS

| 2016/0042252 A1 | 2/2016 | Sawhney et al. |
| 2016/0063321 A1 | 3/2016 | Reese et al. |
| 2021/0073890 A1 | 3/2021 | Lee et al. |
| 2021/0209739 A1* | 7/2021 | Wen .................. H01M 10/4285 |
| 2023/0251212 A1* | 8/2023 | Wagner .................. G01N 23/18 |
| | | 382/141 |
| 2023/0368367 A1* | 11/2023 | Zeng ................ H01M 10/4285 |

FOREIGN PATENT DOCUMENTS

| CN | 109472284 A | 3/2019 |
| CN | 111598877 A | 8/2020 |
| CN | 111767204 A | 10/2020 |
| CN | 111999273 A | 11/2020 |
| CN | 112084998 A | 12/2020 |
| CN | 112241699 A | 1/2021 |
| CN | 113821094 A | 12/2021 |
| CN | 115809982 A | 3/2023 |
| EP | 3683572 A1 | 7/2020 |

OTHER PUBLICATIONS

Extended European Search Report issued Sep. 17, 2024 in European Patent Application No. 23789485.2.

Office Action issued Feb. 14, 2025 in European Patent Application No. 23789485.2.

Written Opinion mailed on Jun. 21, 2023, received for PCT Application PCT/CN2023/084745, filed on Mar. 29, 2023, 8 pages including English Translation.

Notice of Decision of Granting Patent mailed on Sep. 12, 2023, received for CN Application 202210946085.7, 7 pages including English Translation.

First Office Action mailed on Jun. 5, 2023, received for CN Application 202210946085.7, 21 pages including English Translation.

* cited by examiner

Acquire images of a flowing cell assembly by a high-speed image acquisition device — S200

Extract image features from the images of the cell assembly — S400

Perform similarity matching between the image features and a preset crush model to obtain a similarity matching result — S600

Obtain a cell crush inspection result based on the similarity matching result — S800

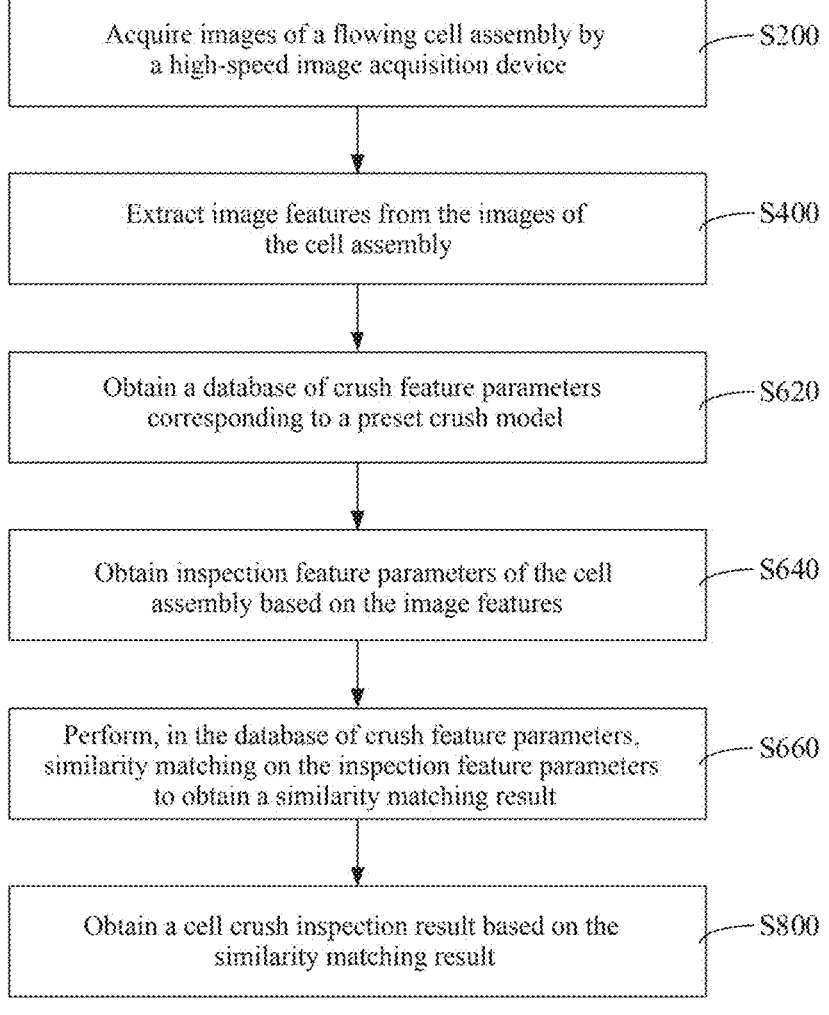

Acquire images of a flowing cell assembly by a high-speed image acquisition device ⸺ S200

Extract image features from the images of the cell assembly ⸺ S400

Obtain a database of crush feature parameters corresponding to a preset crush model ⸺ S620

Obtain inspection feature parameters of the cell assembly based on the image features ⸺ S640

Perform, in the database of crush feature parameters, similarity matching on the inspection feature parameters to obtain a similarity matching result ⸺ S660

Obtain a cell crush inspection result based on the similarity matching result ⸺ S800

*FIG. 3*

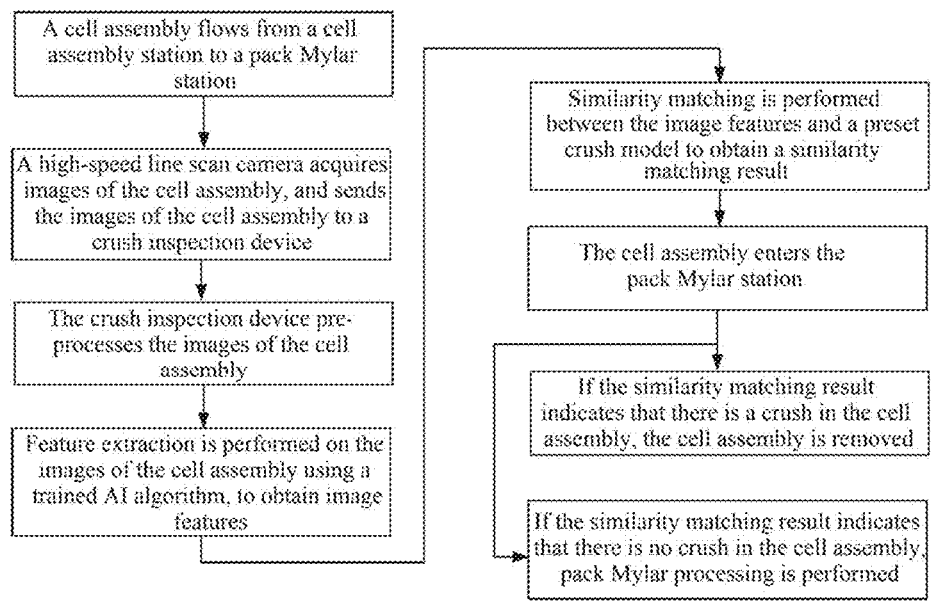

A cell assembly flows from a cell assembly station to a pack Mylar station

A high-speed line scan camera acquires images of the cell assembly, and sends the images of the cell assembly to a crush inspection device The crush inspection device pre-processes the images of the cell assembly Feature extraction is performed on the images of the cell assembly using a trained AI algorithm, to obtain image features Similarity matching is performed between the image features and a preset crush model to obtain a similarity matching result The cell assembly enters the pack Mylar station If the similarity matching result indicates that there is a crush in the cell assembly, the cell assembly is removed If the similarity matching result indicates that there is no crush in the cell assembly, pack Mylar processing is performed

*FIG. 4*

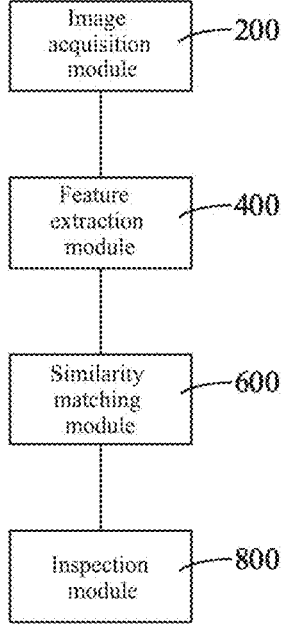

Image acquisition module — 200

Feature extraction module — 400

Similarity matching module — 600

Inspection module — 800

*FIG. 5*

METHOD, APPARATUS AND SYSTEM FOR INSPECTING CELL CRUSH

CROSS-REFERENCE TO RELATED APPLICATIONS

The present application is a continuation of International Application No. PCT/CN2023/084745, filed Mar. 29, 2023, which claims priority to Chinese patent application no. 202210946085.7, filed on Aug. 8, 2022, and entitled "METHOD, APPARATUS AND SYSTEM FOR INSPECTING CELL CRUSH", each of which is incorporated herein by reference in its entirety.

TECHNICAL FIELD

The present application relates to the technical field of battery defect inspection, and in particular to a method, apparatus and system for inspecting a cell crush, a computer device, a storage medium, and a computer program product.

BACKGROUND ART

Cell pack Mylar is an extremely important process in the production of battery cells. Mylar is a polyester film with a good insulating property, which wraps around the surface of a cell and isolates the cell from an external aluminum shell, thus protecting the cell.

After cell assembly and before pack Mylar film wrapping, cells need to be subjected to crush inspection of the surface appearance of the cells, to prevent a crushed cell from affecting the performance of a finished battery with the crushed cell assembled.

Conventional cell crush inspection schemes can achieve crush inspection, but it cannot meet the requirements of faster production with the innovation of cell production processes and production lines as well as the acceleration of the overall production.

SUMMARY OF THE DISCLOSURE

According to various embodiments of the present application, a method, apparatus and system for inspecting a cell crush, a computer device, a storage medium, and a computer program product are provided.

In a first aspect, the present application provides a method for inspecting a cell crush, where the method is applied in a crush inspection device, and the crush inspection device can be specifically implemented by a logic controller. The method includes the following steps:

acquiring images of a flowing cell assembly by a high-speed image acquisition device;

extracting image features from the images of the cell assembly;

performing similarity matching between the image features and a preset crush model to obtain a similarity matching result; and obtaining a cell crush inspection result based on the similarity matching result.

In the technical solution of the embodiments of the present application, the high-speed image acquisition device is used to acquire the images of the cell assembly, enabling the images to be acquired at a faster rate. Furthermore, the images of the flowing cell assembly are acquired without the need to stop the cell assembly and keep same stationary, having no impact on normal line production. In addition, the cell crush inspection result is quickly obtained through image feature extraction for the acquired images of the cell and based on similarity matching with the preset crush model. The whole solution can meet the requirements of faster production, enabling rapid cell crush inspection.

In some embodiments, the acquiring images of a flowing cell assembly by a high-speed image acquisition device includes:

acquiring, by a high-speed line scan camera, the images of the cell assembly which flows from a cell assembly station to a pack Mylar station.

In the technical solution of the embodiments of the present application, the use of the high-speed line scan camera for image acquisition allows for high-speed and effective acquisition of the images of the cell assembly, and in the process of acquiring the images of the cell assembly, the cell assembly flows from the cell assembly station to the pack Mylar station along the production line, which does not affect normal line production and can meet the requirements of faster production.

In some embodiments, the performing similarity matching between the image features and a preset crush model to obtain a similarity matching result includes:

obtaining a database of crush feature parameters corresponding to the preset crush model;

obtaining inspection feature parameters of the cell assembly based on the image features; and performing, in the database of crush feature parameters, similarity matching on the inspection feature parameters to obtain a similarity matching result.

In the technical solution of the embodiments of the present application, the corresponding database of crush feature parameters is obtained based on the preset crush model, and the similarity matching is performed, in the database of crush feature parameters, on the inspection feature parameters of the cell assembly obtained based on graphical features, to find crush feature parameters with matched similarity, such that the similarity matching result can be obtained quickly and accurately.

In some embodiments, the performing, in the database of crush feature parameters, similarity matching on the inspection feature parameters to obtain a similarity matching result includes:

extracting different range values of crush feature parameters from the database of crush feature parameters;

identifying, from the inspection feature parameters, similar crush feature parameters that are within the different range values of crush feature parameters;

extracting, from the database of crush feature parameters, similar weights corresponding to the similar crush feature parameters; and obtaining a similarity matching result based on the similar crush feature parameters and the similar weights.

In the technical solution of the embodiments of the present application, similarity matching calculation is performed on the similar crush feature parameters in the inspection feature parameters that are within the different range values of crush feature parameters, and different similar crush feature parameters are pre-assigned different weights, which fully takes into account the magnitude of impact of different crush features in terms of the representation of crush defects, such that a more accurate similarity matching result can be obtained.

In some embodiments, before the extracting image features from the images of the cell assembly, the method further includes:

pre-processing the images of the cell assembly, the pre-processing including at least one of denoising, image enhancement, gray-scale processing, binary image processing, edge detection and segmentation, and histogram matching.

In the technical solution of the embodiments of the present application, before image feature extraction for the images of the cell assembly, the images of the cell assembly are further pre-processed, so that the image features can be more quickly extracted from the images of the cell assembly subsequently.

In some embodiments, before the extracting image features from the images of the cell assembly, the method further includes:

obtaining sample images labeled with different types of crush features; and training an AI feature extraction algorithm with the sample images to obtain a trained AI feature extraction algorithm.

The extracting image features from the images of the cell assembly includes:

extracting the image features from the images of the cell assembly using the trained AI feature extraction algorithm.

In the technical solution of the embodiments of the present application, the AI feature algorithm is trained with the sample images to obtain an AI algorithm that can allow for accurate extraction of crush image features. For extraction of the image features from the images of the cell assembly, the image features are extracted from the images of the cell assembly directly using the trained AI feature extraction algorithm. Therefore, the image features can be extracted from the images of the cell assembly more quickly and accurately.

In a second aspect, the present application further provides an apparatus for inspecting a cell crush. The apparatus includes:

an image acquisition module configured to acquire images of a flowing cell assembly by a high-speed image acquisition device;

a feature extraction module configured to extract image features from the images of the cell assembly;

a similarity matching module configured to perform similarity matching between the image features and a preset crush model to obtain a similarity matching result; and an inspection module configured to obtain a cell crush inspection result based on the similarity matching result.

In a third aspect, the present application further provides a system for inspecting a cell crush, the system including a high-speed line scan image acquisition device and an inspection module, where the high-speed line scan image acquisition device is configured to: acquire images of a flowing cell assembly, and send the images of the cell assembly to the inspection module; and the inspection module is configured to perform crush inspection by using the above-mentioned method.

In a fourth aspect, the present application provides a computer device, including a memory and one or more processors, where the memory stores computer-readable instructions that, when executed by the one or more processors, cause the one or more processors to perform the steps of the above-mentioned method for inspecting a cell crush.

In a fifth aspect, the present application provides one or more computer storage media storing computer-readable instructions that, when executed by one or more processors, cause the one or more processors to perform the steps of the above-mentioned method for inspecting a cell crush.

In a sixth aspect, the present application provides a computer program product including a computer program, where the computer program, when executed by one or more processors, causes the one or more processors to perform the steps of the above-mentioned method for inspecting a cell crush.

The above description is merely an overview of the technical solutions of the present application. In order to more clearly understand the technical means of the present application to implement same according to the content of the description, and in order to make the above and other objectives, features and advantages of the present application more obvious and understandable, specific implementations of the present application are illustratively described below.

BRIEF DESCRIPTION OF THE DRAWINGS

In order to illustrate the technical solutions of the embodiments of the present application more clearly, the accompanying drawings required in the description of the embodiments of the present application will be described briefly below. Obviously, the accompanying drawings described below are merely some embodiments of the present application, and for those of ordinary skill in the art, other accompanying drawings can also be obtained from these accompanying drawings without any creative efforts.

FIG. 3 is a schematic flowchart of a method for inspecting a cell crush according to some embodiments;

FIG. 4 is a schematic flowchart of a method for inspecting a cell crush according to some embodiments;

FIG. 5 is a structural block diagram of an apparatus for inspecting a cell crush according to some embodiments.

DETAILED DESCRIPTION OF EMBODIMENTS

Figure 1:
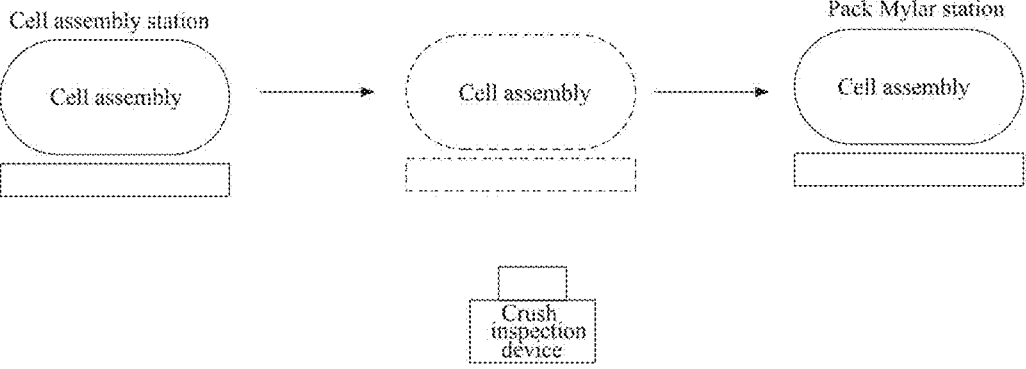
FIG. 1 is a schematic diagram of an application scenario of a method for inspecting a cell crush according to some embodiments of the present application.

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures and characteristics described in conjunction with the embodiment may be included in some embodiments of the present application. The phrase at various locations in the specification does not necessarily refer to the same embodiment, or an independent or alternative embodiment exclusive of another embodiment. Those skilled in the art understand explicitly or implicitly that the embodiment described herein may be combined with another embodiment.

Cell assembly is a battery process in which two bare cells are folded from an unwound state to an overlapping state. Mylar is a polyester film with a good insulating property, which wraps around the surface of a cell and isolates the cell from an external aluminum shell, thus protecting the cell. After cell assembly and before pack Mylar film wrapping, cells need to be subjected to crush inspection of the surface appearance of the cells, to prevent a crushed cell from affecting the performance of a finished battery with the crushed cell assembled.

In conventional technologies, four visual 2D cameras are used for crush inspection of front and back sides of a large face of the cell. It is noted in the present application that in conventional technologies, in the process of using visual 2D cameras for crush inspection of the front and back sides of large faces of the cell, two 2D cameras are used for each of the two large faces of the cell assembly, and that there is a need to stop the moving cell assembly on the production line and then keep the stopped cell assembly stationary during an image capturing process, such that the images of the cell assembly are captured in the stationary state. With the upgrade of the cell production equipment/production line, the production rate has increased from the conventional 12 PPM (Pages per minute) to the current 24 PPM. The conventional solution of using 2D cameras to locate and capture pictures for crush inspection can no longer meet the requirements of the production rate of the cell production line.

In order to solve the above problem that the conventional technologies for crush inspection of a cell assembly cannot meet the requirements of faster production, a new method for inspecting a cell crush is proposed, the method including: acquiring images of a flowing cell assembly by a high-speed image acquisition device; extracting image features from the images of the cell assembly; performing similarity matching between the image features and a preset crush model to obtain a similarity matching result; and obtaining a cell crush inspection result based on the similarity matching result. In the entire solution, the high-speed image acquisition device is used to acquire the images of the cell assembly, enabling the images to be acquired at a faster rate. Furthermore, the images of the flowing cell assembly are acquired without the need to stop the cell assembly and keep same stationary, having no impact on normal line production. In addition, the cell crush inspection result is quickly obtained through image feature extraction for the acquired images of the cell and based on similarity matching with the preset crush model. The whole solution can meet the requirements of faster production, enabling rapid cell crush inspection.

The method for inspecting a cell crush provided in the embodiments of the present application can be applied in a crush inspection device on a cell production line. As shown in FIG. 1, the crush inspection device is arranged between a cell assembly station and a pack Mylar station. The cell assembly flows from the cell assembly station to the pack Mylar station. The crush inspection device is configured to: acquire images of a flowing cell assembly by a high-speed image acquisition device; extract image features from the images of the cell assembly; perform similarity matching between the image features and a preset crush model to obtain a similarity matching result; and obtain a cell crush inspection result based on the similarity matching result. In some embodiments, the crush inspection device may feed the obtained crush inspection result back to operators to prompt them to remove a cell assembly with a crush; alternatively, other automation equipment can directly remove the cell assembly with a crush from the production line.

Figure 2:
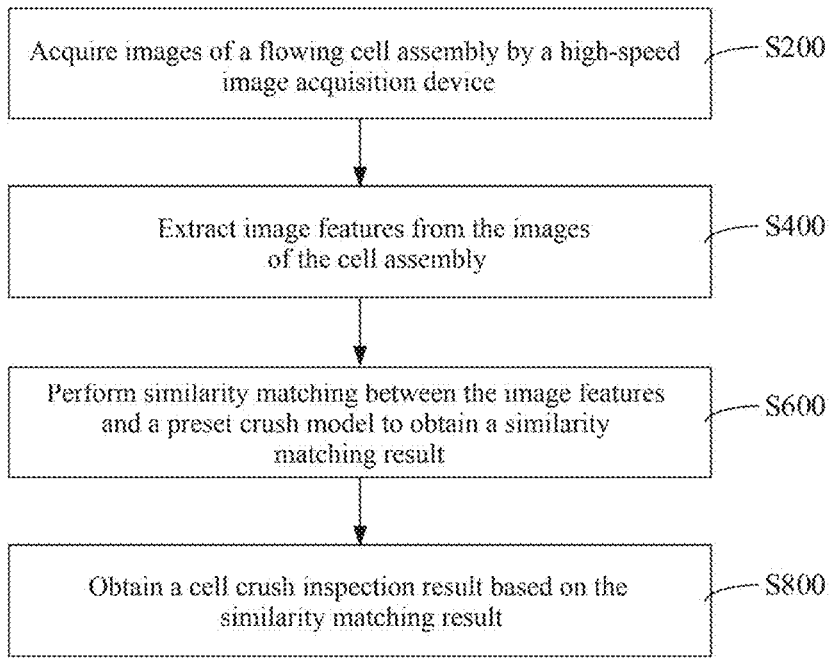
FIG. 2 is a schematic flowchart of a method for inspecting a cell crush according to some embodiments.

As shown in FIG. 2, the present application provides a method for inspecting a cell crush, where the method is applied in a crush inspection device, and the crush inspection device can be specifically implemented by a logic controller. The method includes the following steps.

In S200: images of a flowing cell assembly are acquired by a high-speed image acquisition device.

The high-speed image acquisition device is a device that performs high-speed image acquisition, which can acquire images of an object at an extremely high rate. In some embodiments, the high-speed image acquisition device may be a high-speed line scan camera. During practical applications, two high-speed line scan cameras can be used to acquire the images of the flowing cell assembly, for example, one high-speed line scan camera can be used to acquire an image of a front side of the cell assembly and the other high-speed line scan camera can be used to acquire an image of a back side of the cell assembly. The flowing cell assembly is a cell assembly that moves along the cell production line. As mentioned above, the cell assembly generally flows from the cell assembly station to the pack Mylar station. Therefore, during practical applications, the high-speed line scan camera can be used to acquire the images of the cell assembly which flows from the cell assembly station to the pack Mylar station.

In S400: image features are extracted from the images of the cell assembly.

The image features are parameters for representing image feature points. In some embodiments, the image features can use variables, such as gray-scale value, shape, angle, length and width, and scaling, as parameters. The image features can be extracted from the images of the cell assembly using a trained feature extraction algorithm.

In S600: similarity matching is performed between the image features and a preset crush model to obtain a similarity matching result.

The preset crush model, as a pre-defined crush model, is specifically a model constructed based on the image features corresponding to different crush conditions in the cell assembly. In other words, the preset crush model represents variable parameters corresponding to different crush conditions in the cell assembly. Matching is performed between the image features acquired in real time and the variable parameters corresponding to different crush conditions to obtain a similarity matching result.

In S800: a cell crush inspection result is obtained based on the similarity matching result.

The similarity matching result obtained after processing in S600 indicates the possibility of presence of a crush on the cell assembly. In some embodiments, the similarity matching result is a similarity score, and the similarity score obtained in real time can be compared with a preset similarity score threshold. If the similarity score is not less than the preset similarity score threshold, this indicates that a crush defect is present in the cell assembly; and if the similarity score is less than the preset similarity score threshold, no crush defect is present in the cell assembly. In some embodiments, for a cell assembly with a crush defect, a prompt message for giving an exception prompt can be sent out, so that the operator or automation equipment can remove the cell assembly with a crush defect from the production line.

In the technical solution of the embodiments of the present application, the high-speed image acquisition device is used to acquire the images of the cell assembly, enabling the images to be acquired at a faster rate. Furthermore, the images of the flowing cell assembly are acquired without the need to stop the cell assembly and keep same stationary, having no impact on normal line production. In addition, the cell crush inspection result is quickly obtained through image feature extraction for the acquired images of the cell and based on similarity matching with the preset crush model. The whole solution can meet the requirements of faster production, enabling rapid cell crush inspection.

In some embodiments, the acquiring images of a flowing cell assembly by a high-speed image acquisition device includes:

acquiring, by a high-speed line scan camera, the images of the cell assembly which flows from a cell assembly station to a pack Mylar station.

The high-speed line scan camera can quickly acquire the images of the cell assembly which flows from the cell assembly station to the pack Mylar station. In some embodiments, two high-speed line scan cameras can be used to acquire the images of the flowing cell assembly, one of which acquires an image of a front side of the cell assembly, and the other acquires an image of a back side of the cell assembly. Unlike conventional methods in which four 2D cameras are required for image acquisition, here, due to the cell assembly is flowing, the image acquisition for both the front and back sides eliminates the requirement that two image acquisition devices (2D cameras) should be used for acquisition of every single side when the width of a single image acquisition device cannot reach the entire length of the cell assembly, simplifying the structure for image acquisition.

In the technical solution of the embodiments of the present application, the use of the high-speed line scan camera for image acquisition allows for high-speed and effective acquisition of the images of the cell assembly, and in the process of acquiring the images of the cell assembly, the cell assembly flows from the cell assembly station to the pack Mylar station along the production line, which does not affect normal line production and can meet the requirements of faster production.

As shown in FIG. 3, in some embodiments, S600 includes:

S620: obtaining a database of crush feature parameters corresponding to the preset crush model;

S640: obtaining inspection feature parameters of the cell assembly based on the image features; and

S660: performing, in the database of crush feature parameters, similarity matching on the inspection feature parameters to obtain a similarity matching result.

As mentioned above, the preset crush model, as a predefined crush model, represents variable parameters corresponding to different crush conditions in the cell assembly, and generates a database of crush feature parameters based on the variable parameters. In some embodiments, the database of crush feature parameters can include corresponding variable parameters, such as gray-scale value, shape, angle, length and width, and scaling, in the presence of crush defects. Based on the image features of the cell assembly acquired in real time, the inspection feature parameters are obtained. In the database of crush feature parameters, the similarity matching is performed on the inspection feature parameters to determine whether there are similar inspection feature parameters, that is, whether there are suspected crush defects in the cell assembly, such that the similarity matching result is obtained.

In the technical solution of the embodiments of the present application, the corresponding database of crush feature parameters is obtained based on the preset crush model, and the similarity matching is performed, in the database of crush feature parameters, on the inspection feature parameters of the cell assembly obtained based on graphical features, to find crush feature parameters with matched similarity, such that the similarity matching result can be obtained quickly and accurately.

In some embodiments, the performing, in the database of crush feature parameters, similarity matching on the inspection feature parameters to obtain a similarity matching result includes:

extracting different range values of crush feature parameters from the database of crush feature parameters; identifying, from the inspection feature parameters, similar crush feature parameters that are within the different range values of crush feature parameters; extracting, from the database of crush feature parameters, similar weights corresponding to the similar crush feature parameters; and obtaining a similarity matching result based on the similar crush feature parameters and the similar weights.

During the actual process of similarity matching, in order to be able to effectively identify crush defects, a range value of feature parameters of features is used as an object for similarity comparison. In some embodiments, different crush feature parameters correspond to different range values of feature parameters, for example a range value of (a, b) millimeters in length. If there are feature parameters, in the inspection feature parameters acquired in real time, that are within different range values of crush feature parameters, this indicates that the feature parameters represent the risk of crush defects occurring in the cell assembly. The feature parameters that are within the different range values of crush feature parameters are similar crush feature parameters. In some embodiments, similar weights corresponding to these similar crush feature parameters can be extracted from the database of crush feature parameters, and these similar feature parameters can be processed by means of weighting to obtain a similarity matching result.

Detained explanation will be made below in combination with a specific instance. A corresponding range value of (a, b) in length, range value of (c, d) in gray-scale, and range value of (e, f) in angle in the presence of a crush defect are extracted from the database of crush feature parameters. If inspection features include length x, gray-scale y, and angle z, when x is within the range (a, b), y is within the range (c, d), and z is not within the range (e, f), it is determined that length and gray-scale are similar crush feature parameters. Then, similar weights m and n corresponding to length and gray-scale are extracted from the database of crush feature parameters. The similarity score is calculated by means of weighting to obtain the similarity matching result.

In the technical solution of the embodiments of the present application, similarity matching calculation is performed on the similar crush feature parameters in the inspection feature parameters that are within the different range values of crush feature parameters, and different similar crush feature parameters are pre-assigned different weights, which fully takes into account the magnitude of impact of different crush features in terms of the representation of crush defects, such that a more accurate similarity matching result can be obtained.

In some embodiments, before the extracting image features from the images of the cell assembly, the method further includes:

pre-processing the images of the cell assembly, the pre-processing including at least one of denoising, image enhancement, gray-scale processing, binary image processing, edge detection and segmentation, and histogram matching.

In this embodiment, before image features are extracted from the images of the cell assembly, the images of the cell assembly are further pre-processed. The pre-processing can be specifically any one of or any combination of denoising, image enhancement, gray-scale processing, binary image processing, edge detection and segmentation, and histogram matching. The pre-processing can sequentially include denoising, image enhancement, gray-scale processing, binary image processing, edge detection and segmentation, and histogram matching.

In the technical solution of the embodiments of the present application, before image feature extraction for the images of the cell assembly, the images of the cell assembly are further pre-processed, so that the image features can be more quickly extracted from the images of the cell assembly subsequently.

In some embodiments, before the extracting image features from the images of the cell assembly, the method further includes:

obtaining sample images labeled with different types of crush features; and training an AI feature extraction algorithm with the sample images to obtain a trained AI feature extraction algorithm. The extracting image features from the images of the cell assembly includes: extracting the image features from the images of the cell assembly using the trained AI feature extraction algorithm.

AI algorithm is an algorithm with a machine learning capability, which can be trained by learning with sample graphics labeled with different types of crush features, to obtain the trained AI feature extraction algorithm. When image feature extraction is required, the image features are extracted from the images of the cell assembly directly using the trained AI feature extraction algorithm.

In the technical solution of the embodiments of the present application, the AI feature algorithm is trained with the sample images to obtain an AI algorithm that can allow for accurate extraction of crush image features. For extraction of the image features from the images of the cell assembly, the image features are extracted from the images of the cell assembly directly using the trained AI feature extraction algorithm. Therefore, the image features can be extracted from the images of the cell assembly more quickly and accurately.

The technical solutions of the method for inspecting a cell crush in the present application will be illustrated in detail below in combination with a specific application instance.

1. A cell assembly flows from a cell assembly station to a pack Mylar station.

2. A high-speed line scan camera acquires images of the cell assembly, and sends the images of the cell assembly to a crush inspection device.

3. The crush inspection device pre-processes the images of the cell assembly.

4. Feature extraction is performed on the images of the cell assembly using a trained AI algorithm, to obtain image features.

5. Similarity matching is performed between the image features and a preset crush model to obtain a similarity matching result.

6. The cell assembly enters the pack Mylar station.

7. If the similarity matching result indicates that there is a crush in the cell assembly, the cell assembly is removed. If the similarity matching result indicates that there is no crush in the cell assembly, pack Mylar processing is performed.

It should be understood that although the steps in the flowchart that are involved in the embodiments described above are displayed in sequence as indicated by arrows, these steps are not necessarily sequentially executed in the order indicated by the arrows. Unless explicitly described herein, the execution of these steps is not limited to a strict order, instead, the steps may be executed in another order. Furthermore, some of the steps in the flowcharts involved in the embodiments as described above may include a plurality of steps or stages which are not necessarily performed at the same time, but may be performed at different times, and the order in which these steps or stages can be performed is not necessarily sequential, but may be performed in turn or alternately with other steps or some of steps or stages in other steps.

Based on the same inventive concept, an embodiment of the present application further provides an apparatus for inspecting a cell crush to implement the method for inspecting a cell crush described above. The apparatus provides an implementation solution for solving the problems that is similar to the implementation solution described in the above method. Therefore, for specific limitations in one or more embodiments of the apparatus for inspecting a cell crush provided below, reference may be made to the above limitations on the method for inspecting a cell crush, which will not be repeated herein.

As shown in FIG. 5, the present application further provides an apparatus for inspecting a cell crush. The apparatus includes:

an image acquisition module 200 configured to acquire images of a flowing cell assembly by a high-speed image acquisition device;

a feature extraction module 400 configured to extract image features from the images of the cell assembly;

a similarity matching module 600 configured to perform similarity matching between the image features and a preset crush model to obtain a similarity matching result; and an inspection module 800 configured to obtain a cell crush inspection result based on the similarity matching result.

According to the apparatus for inspecting a cell crush described above, the high-speed image acquisition device is used to acquire the images of the cell assembly, enabling the images to be acquired at a faster rate. Furthermore, the images of the flowing cell assembly are acquired without the need to stop the cell assembly and keep same stationary, having no impact on normal line production. In addition, the cell crush inspection result is quickly obtained through image feature extraction for the acquired images of the cell and based on similarity matching with the preset crush model. The whole solution can meet the requirements of faster production, enabling rapid cell crush inspection.

In some embodiments, the image acquisition module 200 is further configured to acquire, by a high-speed line scan camera, the images of the cell assembly which flows from a cell assembly station to a pack Mylar station.

In some embodiments, the similarity matching module 600 is further configured to: obtain a database of crush feature parameters corresponding to the preset crush model; obtain inspection feature parameters of the cell assembly based on the image features; and perform, in the database of crush feature parameters, similarity matching on the inspection feature parameters to obtain a similarity matching result.

In some embodiments, the similarity matching module 600 is further configured to: extract different range values of crush feature parameters from the database of crush feature parameters; identify, from the inspection feature parameters, similar crush feature parameters that are within the different range values of crush feature parameters; extract, from the database of crush feature parameters, similar weights corresponding to the similar crush feature parameters; and obtain a similarity matching result based on the similar crush feature parameters and the similar weights.

In some embodiments, the above apparatus for inspecting a cell crush further includes a pre-processing module configured to pre-process the images of the cell assembly, the pre-processing including at least one of denoising, image enhancement, gray-scale processing, binary image processing, edge detection and segmentation, and histogram matching.

In some embodiments, the feature extraction module 400 is further configured to: obtain sample images labeled with different types of crush features, train an AI feature extraction algorithm with the sample images to obtain a trained AI feature extraction algorithm; and extract the image features from the images of the cell assembly using the trained AI feature extraction algorithm.

The modules in the above apparatus for inspecting a cell crush can be fully or partially implemented in software, hardware, and a combination thereof. The modules above may be embedded, in the form of hardware, in or independent of a processor in a computer device, or may be stored, in the form of software, in a memory of the computer device, so as to be invoked by the processor to perform the operations corresponding to the modules above.

In addition, the present application further provides a system for inspecting a cell crush, the system including a high-speed line scan image acquisition device and an inspection module, where the high-speed line scan image acquisition device is configured to: acquire images of a flowing cell assembly, and send the images of the cell assembly to the inspection module; and the inspection module is configured to perform crush inspection by using the above-mentioned method.

Figure 6:
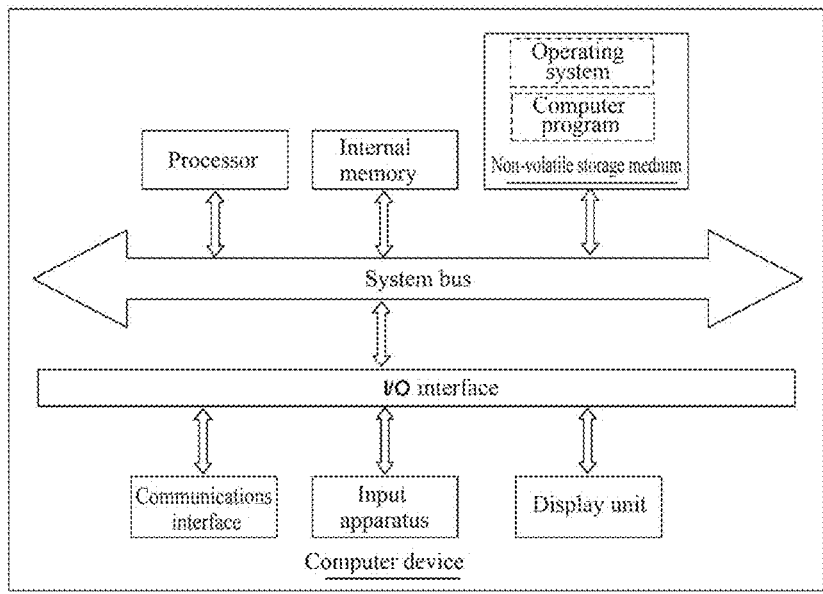
FIG. 6 is a diagram of an internal structure of a computer device according to some embodiments.

In some embodiments, a computer device is provided. The computer device may be a terminal, and a diagram of an internal structural thereof may be as shown in FIG. 6. The computer device includes a processor, a memory, a communications interface, a display screen, and an input apparatus that are connected via a system bus. The processor of the computer device is used to provide computing and control capabilities. The memory of the computer device includes a non-volatile storage medium and an internal memory. The non-volatile storage medium stores an operating system and a computer program. The internal memory provides an environment for operation of the operating system and the computer program in the non-volatile storage medium. The communications interface of the computer device is used for wired or wireless communication with an external terminal, and the wireless method can be implemented by WIFI, a mobile cellular network, NFC (near-field communication), or other technologies. The computer program, when executed by the processor, implements a method for inspecting a cell crush. The display screen of the computer device may be a liquid crystal display or an electronic ink display. The input apparatus of the computer device may be a touch layer covering the display screen, or a key, trackball or trackpad set on a casing of the computer device, or an external keyboard, trackpad or mouse, etc.

Those skilled in the art can understand that a structure shown in FIG. 6 is merely a block diagram of part of the structure related to the solutions of the present application, and that does not constitute a limitation on the computer device to which the solutions of the present application are applied. Specifically, the computer device may include more or fewer components than those shown in the drawings, or combine some components, or have different component arrangements.

In some embodiments, a computer device is provided, which includes a memory and one or more processors, where the memory stores computer-readable instructions that, when executed by the one or more processors, cause the one or more processors to perform the steps of the above-mentioned method for inspecting a cell crush to obtain a cell crush inspection result.

In some embodiments, the present application provides one or more computer storage media storing computer-readable instructions that, when executed by one or more processors, cause the one or more processors to perform the steps of the above-mentioned method for inspecting a cell crush to obtain a cell crush inspection result.

In some embodiments, the present application provides a computer program product including a computer program, where the computer program, when executed by one or more processors, causes the one or more processors to perform the steps of the above-mentioned method for inspecting a cell crush.

Those skilled in the art can understand that all or some of the procedures in the methods in the above embodiments can be implemented by a computer program instructing related hardware. The computer program may be stored in a non-volatile computer-readable storage medium. The computer program, when executed, may include the procedures of the foregoing method embodiments. Any reference to a memory, a database, or other media used in the embodiments provided in the present application may include one of a non-volatile memory and/or a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, etc. The volatile memory may include a random access memory (RAM), an external cache memory, etc. By way of illustration but not limitation, the RAM may be in various forms, such as a static random access memory (SRAM) or a dynamic random access memory (DRAM). The database involved in the embodiments provided in the present application may include one of a relational database and a non-relational database. The non-relational database may include a blockchain-based distributed database, etc., and is not limited thereto. The processor involved in the embodiments provided in the present application may be a general-purpose processor, a central processor, a graphics processor, a digital signal processor, a programmable logic device, a quantum computing-based data processing logic device, etc., and is not limited thereto.

The technical features of the above embodiments can be combined in any manner, and in order to simplify the description, not all possible combinations of the technical features of the above embodiments are described. However, as long as there is no conflict between the combinations of these technical features, they should be considered to be within the scope of the description in this application.

The above embodiments merely describe several implementations of the present application more specifically and in more detail, but cannot be thus understood as limitations to the patent scope of the present application. It should be pointed out that those of ordinary skill in the art may also make several variations and improvements without departing from the concept of the present application. All these variations and improvements fall within the scope of protection of the present application. Therefore, the scope of protection of the present application shall be subject to the appended claims.

The invention claimed is:

1. A method for inspecting a cell crush, comprising:
acquiring images of a flowing cell assembly by an image acquisition device;
extracting image features from the images of the cell assembly;
performing similarity matching between the image features and a preset crush model to obtain a similarity matching result, wherein
    the preset crush model corresponds to crush feature parameters comprising at least one of gray-scale value, shape, angle, length and width, and scaling, and
    the performing similarity matching includes:
        identifying, from the image features, similar crush feature parameters that are within different range values of crush feature parameters corresponding to the preset crush model;
        determining similar weights corresponding to the similar crush feature parameters based on the similar crush feature parameters; and
        obtaining the similarity matching result based on the similar crush feature parameters and the determined similar weights; and
    obtaining a cell crush inspection result based on the similarity matching result.

2. The method according to claim 1, wherein the acquiring images of the flowing cell assembly by the image acquisition device comprises:
acquiring, by a line scan camera, the images of the cell assembly which flows from a cell assembly station to a pack Mylar station.

3. The method according to claim 1, wherein the performing similarity matching between the image features and the preset crush model to obtain the similarity matching result comprises:
obtaining a database of crush feature parameters corresponding to the preset crush model;
obtaining inspection feature parameters of the cell assembly based on the image features; and
performing, in the database of crush feature parameters, similarity matching on the inspection feature parameters to obtain the similarity matching result.

4. The method according to claim 3, wherein the performing, in the database of crush feature parameters, similarity matching on the inspection feature parameters to obtain the similarity matching result comprises:
extracting the different range values of crush feature parameters from the database of crush feature parameters;
identifying, from the inspection feature parameters, similar crush feature parameters that are within the different range values of crush feature parameters;
extracting, from the database of crush feature parameters, similar weights corresponding to the similar crush feature parameters; and
obtaining the similarity matching result based on the similar crush feature parameters and the similar weights.

5. The method according to claim 1, wherein before the extracting image features from the images of the cell assembly, the method further comprises:
pre-processing the images of the cell assembly, the pre-processing comprising at least one of denoising, image enhancement, gray-scale processing, binary image processing, edge detection and segmentation, and histogram matching.

6. The method according to claim 1, wherein before the extracting image features from the images of the cell assembly, the method further comprises:
obtaining sample images labeled with different types of crush features; and
training an AI feature extraction algorithm with the sample images to obtain a trained AI feature extraction algorithm; and
wherein the extracting image features from the images of the cell assembly comprises:
extracting the image features from the images of the cell assembly using the trained AI feature extraction algorithm.

7. A computer device, comprising:
a memory; and
one or more processors, wherein the memory stores computer-readable instructions that, when executed by the one or more processors, cause the one or more processors to perform the steps of the method according to claim 1.

8. One or more computer storage media storing computer-readable instructions that, when executed by one or more processors, cause the one or more processors to perform the steps of:
the method according to claim 1.

9. The method according to claim 1, wherein:
the image acquisition device acquires the images of the flowing cell assembly without stopping the cell assembly on a production line.

10. An apparatus for inspecting a cell crush, comprising:
image acquisition circuitry configured to acquire images of a flowing cell assembly by an image acquisition device;
feature extraction circuitry configured to extract image features from the images of the cell assembly;
similarity matching circuitry configured to perform similarity matching between the image features and a preset crush model to obtain a similarity matching result, wherein

15 the preset crush model corresponds to crush feature parameters comprising at least one of gray-scale value, shape, angle, length and width, and scaling, and the similarity matching circuitry is further configured to:

identify, from the image features, similar crush feature parameters that are within different range values of crush feature parameters corresponding to the preset crush model;

determine similar weights corresponding to the similar crush feature parameters based on the similar crush feature parameters; and obtain the similarity matching result based on the similar crush feature parameters and the determined similar weights; and inspection circuitry configured to obtain a cell crush inspection result based on the similarity matching result.

11. The apparatus according to claim 10, wherein:

the image acquisition device acquires the images of the flowing cell assembly without stopping the cell assembly on a production line.

12. The apparatus according to claim 10, wherein the similarity matching circuitry is further configured to:

obtain a database of crush feature parameters corresponding to the preset crush model;

obtain inspection feature parameters of the cell assembly based on the image features; and perform, in the database of crush feature parameters, similarity matching on the inspection feature parameters to obtain the similarity matching result.

13. The apparatus according to claim 12, wherein the similarity matching circuitry, when performing, in the database of crush feature parameters, similarity matching on the inspection feature parameters, is further configured to:

extract the different range values of crush feature parameters from the database of crush feature parameters;

wherein the identifying of the similar crush feature parameters comprises identifying, from the inspection feature parameters, similar crush feature parameters that are within the extracted different range values of crush feature parameters; and wherein the determining of the similar weights comprises extracting, from the database of crush feature parameters, the similar weights corresponding to the similar crush feature parameters.

14. A system for inspecting a cell crush, comprising a line scan image acquisition device and inspection circuitry, wherein the line scan image acquisition device is configured to:

acquire images of a flowing cell assembly, and send the images of the cell assembly to the inspection circuitry; and the inspection circuitry is configured to perform crush inspection by using a method for inspecting the cell crush, the method comprising:

acquiring the images of the flowing cell assembly by the line scan image acquisition device;

extracting image features from the images of the cell assembly;

performing similarity matching between the image features and a preset crush model to obtain a similarity matching result, wherein the preset crush model corresponds to crush feature parameters comprising at least one of gray-scale value, shape, angle, length and width, and scaling, and

the performing similarity matching includes:

identifying, from the image features, similar crush feature parameters that are within different range values of crush feature parameters corresponding to the preset crush model;

determining similar weights corresponding to the similar crush feature parameters based on the similar crush feature parameters; and obtaining the similarity matching result based on the similar crush feature parameters and the determined similar weights; and obtaining a cell crush inspection result based on the similarity matching result.

15. The system according to claim 14, wherein:

the line scan image acquisition device acquires the images of the flowing cell assembly without stopping the cell assembly on a production line.

16. The system according to claim 14, wherein:

the line scan image acquisition device is configured to acquire the images of the cell assembly as the cell assembly flows from a cell assembly station to a pack Mylar station.

17. The system according to claim 14, wherein the inspection circuitry, when performing the similarity matching, is further configured to:

obtain a database of crush feature parameters corresponding to the preset crush model;

obtain inspection feature parameters of the cell assembly based on the image features; and perform, in the database of crush feature parameters, similarity matching on the inspection feature parameters to obtain the similarity matching result.

18. The system according to claim 17, wherein the inspection circuitry, when performing, in the database of crush feature parameters, similarity matching on the inspection features parameters, is further configured to:

extract the different range values of crush feature parameters from the database of crush feature parameters;

wherein the identifying the similar crush feature parameters comprises identifying, from the inspection feature parameters, similar crush feature parameters that are within the extracted different range values of crush feature parameters; and wherein the determining the similar weights comprises extracting, from the database of crush feature parameters, the similar weights corresponding to the similar crush feature parameters.

19. The system according to claim 14, wherein the method further comprises, before the extracting image features from the images of the cell assembly:

pre-processing the images of the cell assembly, the pre-processing comprising at least one of denoising, image enhancement, gray-scale processing, binary image processing, edge detection and segmentation, and histogram matching.

20. The system according to claim 14, wherein:

the method further comprises, before the extracting image features from the images of the cell assembly:

obtaining sample images labeled with different types of crush features; and training an AI feature extraction algorithm with the sample images to obtain a trained AI feature extraction algorithm; and wherein the extracting image features from the images of the cell assembly comprises:

extracting the image features from the images of the cell assembly using the trained AI feature extraction algorithm.

* * * * *